(12) United States Patent
Kippelen et al.

(10) Patent No.: US 7,642,918 B2
(45) Date of Patent: Jan. 5, 2010

(54) THIN FLEXIBLE RADIO FREQUENCY IDENTIFICATION TAGS AND SUBSYSTEMS THEREOF

(75) Inventors: Bernard Kippelen, Decatur, GA (US); Gregory D. Durgin, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 347 days.

(21) Appl. No.: 11/584,086

(22) Filed: Oct. 20, 2006

(65) Prior Publication Data

US 2007/0103311 A1   May 10, 2007

Related U.S. Application Data

(60) Provisional application No. 60/729,040, filed on Oct. 21, 2005.

(51) Int. Cl.
*G08B 13/14* (2006.01)
(52) U.S. Cl. .................. 340/572.8; 340/572.1; 340/10.1
(58) Field of Classification Search .............. 340/572.8, 340/572.1, 10.1
See application file for complete search history.

(56) References Cited

U.S. PATENT DOCUMENTS

| | | | |
|---|---|---|---|
| 4,075,632 A * | 2/1978 | Baldwin et al. ................ 342/51 |
| 6,100,804 A * | 8/2000 | Brady et al. .............. 340/572.7 |
| 6,275,157 B1 * | 8/2001 | Mays et al. ............... 340/572.5 |
| 6,531,983 B1 * | 3/2003 | Hirose et al. .......... 343/700 MS |
| 6,657,378 B2 * | 12/2003 | Forrest et al. ................ 313/503 |
| 6,936,190 B2 * | 8/2005 | Yoshida ...................... 252/511 |
| 6,947,513 B2 * | 9/2005 | O'Toole et al. ............. 375/374 |
| 2004/0256467 A1 * | 12/2004 | Clemens et al. ............. 235/492 |
| 2005/0134462 A1 * | 6/2005 | Shelley .................... 340/572.8 |
| 2005/0174376 A1 * | 8/2005 | Deshmukh et al. ............ 347/19 |
| 2005/0189226 A1 | 9/2005 | Loermans et al. |
| 2006/0130742 A1 * | 6/2006 | Carter et al. .................. 117/84 |

OTHER PUBLICATIONS

International Search Report for PCT/US06/41345 dated Apr. 30, 2007.

* cited by examiner

*Primary Examiner*—Toan N Pham
*Assistant Examiner*—Kerri McNally
(74) *Attorney, Agent, or Firm*—Ballard Spahr LLP

(57) ABSTRACT

Embodiments according to the present invention comprised RFID tags comprised of components disposed on a flexible conformal substrate. The substrate may be substantially transparent or opaque and the components may be comprised of organic electronic components. Components and circuits may be manufactured using thin-film deposition processes or by deposition of metal-containing inks using inkjet technology. Exemplary use of an embodiment according to the present invention is as a component in an on-vehicle radio-frequency (RF) automated toll system.

31 Claims, 9 Drawing Sheets

THIN FLEXIBLE RADIO FREQUENCY IDENTIFICATION TAGS AND SUBSYSTEMS THEREOF

CROSS REFERENCE TO RELATED APPLICATION

This application claims benefit of Provisional Patent Application Ser. No. 60/729,040, filed Oct. 21, 2005, which application is hereby fully incorporated by this reference in its entirety and made a part hereof.

FIELD OF THE INVENTION

Embodiments according to the present invention generally relate to radio frequency ("RF") identification tags ("ID") or as commonly known, RFID tags, RFID transponders, or RF tags. More specifically, the embodiments according to the present invention relate to flexible, conformal RFID tags, their methods of manufacture, and use.

BACKGROUND OF THE INVENTION

The use of RFID technology continues to proliferate as the price-point of RFID transponders and interrogation systems decreases and the need for tracking technology increases. Currently, there are several different types of RF tags, which are usually classified by their power source. Generally, the three major types of RFID tags are purely passive, assisted passive, and active tags.

Purely passive tags have no battery or other type of internal or on-board power source to assist communications. All of its signaling circuitry must be driven using received signal power. Since received signal power is generally on the order of microwatts ($\mu$W), or less, a purely passive tag is especially difficult to interrogate over large distances. Because they have no internal power source subject to discharge, purely passive tags generally have an infinite theoretical lifetime of operation.

Assisted passive tags generally require much less power for communications than active tags. An assisted passive tag does not contain active RF components, but does use a small, low-energy power source to drive modulation circuitry. The most common form of assistance is generally from a small watch battery. An exemplary utilization of these RF tags are wireless toll collections on highways. Generally, assisted passive tags have a usable lifetime of 2-3 years.

Active tags use a battery or other on-board power source to drive radio frequency amplifiers as well as baseband and modulation circuitry. The usable range of active tags is generally much larger than a passive tag, although the lifetime of operation is significantly shortened without replenishment of the power supply.

The trade-off between the different types of tags is lifetime vs. range. The truly passive tag should have the lowest reliable range, but the longest usable lifetime. An active tag, on the other hand, could have quite a large range but may only operate for several weeks due to a continuous draw on its on-board battery. Generally, the active tag is usually bulkier and more expensive than the purely passive tag.

It is to be appreciated that all types of RF tags are distinguished from radio beacons, which are transmitters that are always "on" and require no interrogation to extract their information. In contrast to beacons, RF tags are meant for long-lasting, low-powered information exchange.

In many instances, RF tags are bulky and inflexible and have difficulty conforming to surfaces that are not flat. In some instances, they may block a line of sight or prevent the viewing of information or details that lie underneath the RF tag. What is needed are RF tags that overcame challenges found in the art, some of which are described above.

SUMMARY

Embodiments according to the present invention comprised RFID tags comprised of components disposed on a flexible conformal substrate. The substrate may be substantially transparent or opaque and the components may be comprised of organic electronic components. Components and circuits may be manufactured using thin-film deposition processes or by deposition of metal-containing inks using inkjet technology. Exemplary use of an embodiment according to the present invention is as a component in an on-vehicle radio-frequency (RF) automated toll system One aspect of the invention comprises a radio frequency identification (RFID) transponder. The RF transponder is comprised of a substantially flexible, conformal substrate. Disposed on the substrate are one or more electronic devices including an antenna; a power source; a modulator; and a data/identification memory unit. The electronic devices are operatively coupled using one or more conductive circuits disposed upon said flexible, conformal substrate.

In one aspect, the antenna of the RFID transponder comprises a half-wave, folded dipole antenna.

In one aspect, the antenna of the RFID transponder is designed for resonance at a frequency greater than or equal to 900 megahertz (MHz).

In one aspect, the antenna of the RFID transponder is designed for resonance at a frequency of 915 MHz or 2.45 GHz.

In one aspect, the antenna of the RFID transponder is comprised of an electrically-conductive material deposited on a substrate.

In one aspect, the antenna of the RFID transponder is comprised of indium-tin oxide (ITO) deposited on a substrate.

In one aspect, the antenna of the RFID transponder is comprised of a thin-film metallic material deposited on the substrate by an electroless deposition process.

In one aspect, the antenna of the RFID transponder is comprised of one or more of thin-film copper material and thin-film silver material deposited on the substrate.

In one aspect, the antenna of the RFID transponder is comprised of a conductive ink deposited on the substrate by an inkjet process.

In one aspect, the antenna of the RFID transponder is comprised of indium tin oxide (ITO) deposited on a flexible substrate such that the antenna is at least in part substantially optically transparent or opaque.

In one aspect, the antenna of the RFID transponder is comprised of indium tin oxide (ITO) deposited on a flexible substrate comprised of polyethylene teraphthalate (PET) such that the antenna is at least in part substantially optically transparent or opaque.

In one aspect, the antenna of the RFID transponder is comprised of a thin-film metallic material deposited by electroless deposition process on a flexible polyethylene teraphthalate (PET) substrate.

In one aspect, the antenna of the RFID transponder is comprised of a conductive ink deposited by an inkjet process on a flexible polyethylene teraphthalate (PET) substrate.

In one aspect, the substrate of the RFID transponder is substantially optically transparent.

In one aspect, the substrate of the RFID transponder is comprised of material selected from the group consisting of polyethylene teraphthalate (PET), polyimide, poly-ethylene naphthalate (PEN), and liquid crystal polymers (LCP).

In one aspect, the RFID transponder comprises one or more of the modulator, power source or data/identification memory unit disposed onto said substrate and said one or more conductive circuits by flip-chip application where flip-chip application comprises one or more conductive bumps substantially in contact with said one or more of the modulator, power source or data/identification memory unit and the one or more conductive circuits and the one or more of said modulator, power source or data/identification memory unit are substantially covered with an epoxy resin.

In one aspect, the RFID transponder comprises a power source and the power source is comprised of one or more of a charge pump, a rechargeable battery, a non-rechargeable battery, a photovoltaic cell, an organic photovoltaic cell, or combinations thereof.

In one aspect, the RFID transponder comprises a power source and the power source is comprised of a rechargeable battery and an organic photovoltaic cell.

In one aspect, the RFID transponder comprises a modulator and the modulator comprises organic modulator circuitry.

In one aspect, the RFID transponder comprises a modulator and the modulator comprises a positive-intrinsic-negative (PIN) diode.

In yet another aspect, the RFID transponder according to the present invention comprises a radio frequency identification (RFID) transponder having a flexible polyethylene teraphthalate (PET) substrate and one or more electronic devices disposed on the substrate. The electronic devices include a half-wave, folded dipole antenna comprised of indium tin oxide (ITO) deposited on the flexible PET substrate; a power source; a modulator; and a data/identification memory unit. The electronic devices are operatively coupled using one or more conductive circuits disposed upon said flexible (PET) substrate.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention.

BRIEF DESCRIPTION OF THE DRAWINGS

Embodiments according to the invention can be better understood with reference to the following figures. The components within the figures are not necessarily to scale, emphasis instead being placed upon clearly illustrating the principles of the invention. Moreover, in the figures, like reference numerals designate corresponding parts or blocks throughout the different views.

Figure 1:
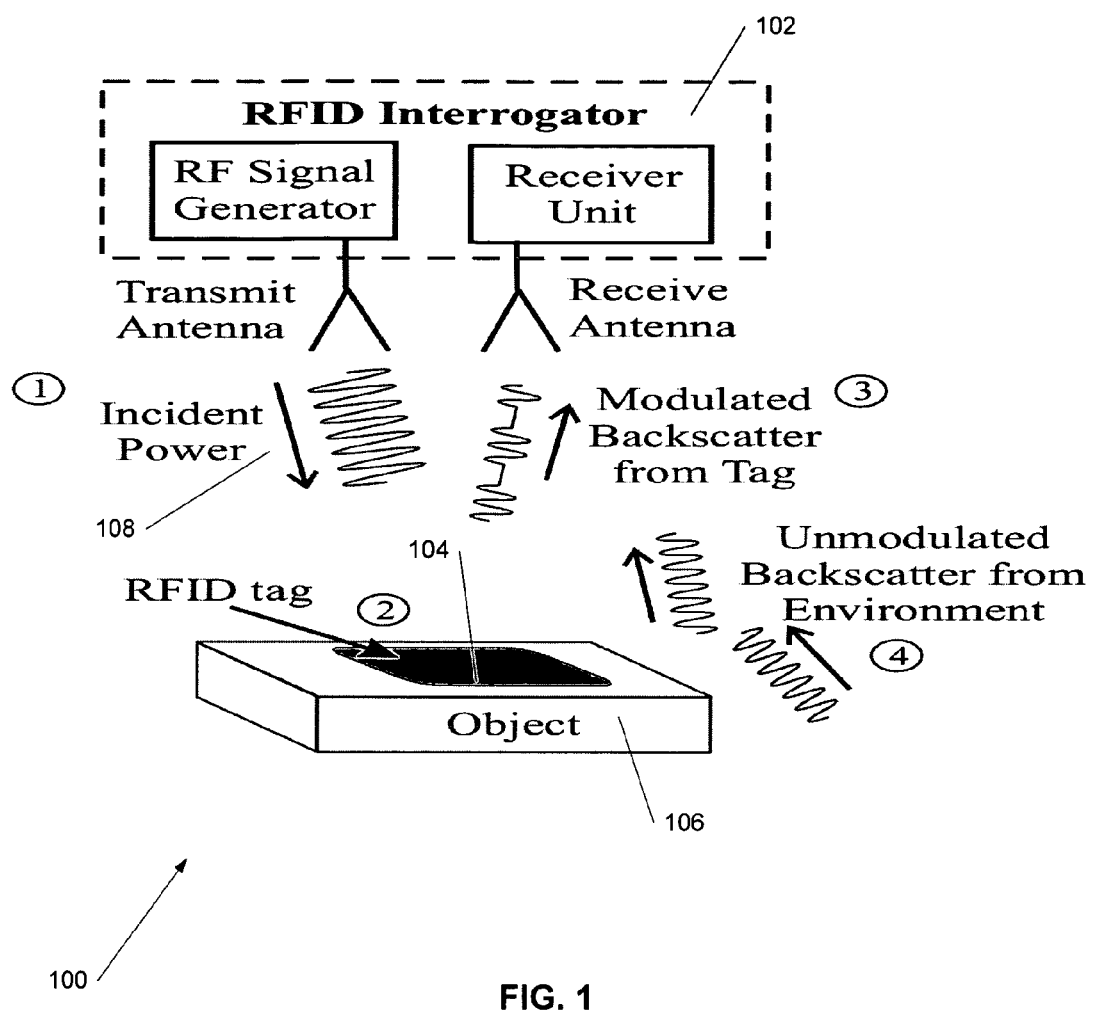
FIG. 1 is an exemplary RFID system comprised of an RFID interrogator and an RF tag proximate to an object.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention.

DETAILED DESCRIPTION

The present invention may be understood more readily by reference to the following detailed description of the invention and the examples included therein and to the figures and their previous and following description.

Before the present systems, articles, devices, and/or methods are disclosed and described, it is to be understood that this invention is not limited to specific systems, specific devices, or to particular methodology, as such may, of course, vary. It is also to be understood that the terminology used herein is for the purpose of describing particular embodiments only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used in the specification and the appended claims, the singular forms "a," "an" and "the" include plural referents unless the context clearly dictates otherwise. Thus, for example, reference to "a RFID tag" includes two or more such tags, and the like.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that throughout the application, data is provided in a number of different formats and that this data represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

"Optional" or "optionally" means that the subsequently described event or circumstance may or may not occur, and that the description includes instances where said event or circumstance occurs and instances where it does not.

Figure 2:
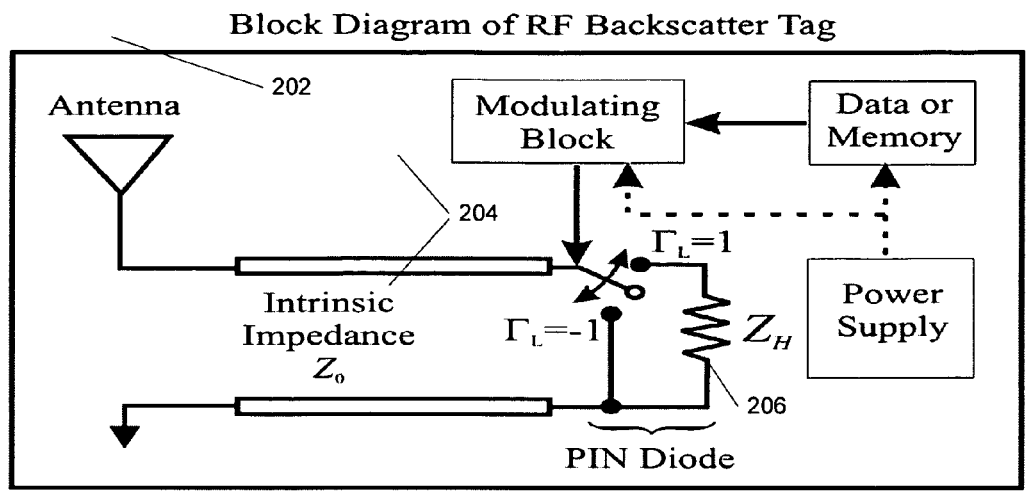
FIG. 2 illustrates a block-diagram and circuitry interface of an exemplary RF backscatter tag.

FIG. 1 is an exemplary RFID system 100 comprised of an RFID interrogator 102 and an RF tag 104 proximate to an object 106. In this instance the RF tag 104 is an RF backscatter tag, which is a form of a purely passive tag that provides short-range, one-way communication, as it does not require RF amplifiers or filters to relay a signal back to the interrogator 102. Instead, the interrogator 102 supplies the initial RF power by sending a continuous wave (unmodulated) carrier 108 towards the tag 104. The tag 104 then modulates data onto the power reflected back towards the interrogator by changing its backscatter cross-section The process of modulation can be described in reference to an RF backscatter tag. FIG. 2 illustrates the block-diagram and circuitry interface of an exemplary RF backscatter tag 200. The process of modulation begins when an antenna 202 receives a sinusoidal signal which is coupled into the circuit with intrinsic impedance, $Z_0$. The antenna load, however, will reflect a portion of the received power back out of the antenna 202, depending on the value of the load at the end of the transmission line 204. If the load is matched, all of the received power is absorbed by the RF tag 200. If the load is a short circuit or an open circuit, then all of the received power is reflected back out of the antenna 202, towards the interrogator. Thus, digital data can be coded onto the backscattered power by switching between different loads.

One way to switch between loads on an RF tag 200 is to terminate the end of the transmission line 204 with a PIN diode 206. A PIN (positive-intrinsic-negative) diode is a specially-doped diode that exhibits an RF resistance with a strong dependence on its DC bias current. When forward-biased, the PIN diode resembles an RF short circuit. When reverse-biased, the PIN diode resembles an RF open circuit. Thus, by changing the low-frequency voltage signal that biases the PIN diode, a signal can be phase-modulated onto the backscattered radio waves. Modulated backscatter is the basic operating principle of a microwave frequency RFID sensor.

RFID tags may be designed to operate at different frequencies. There is no universal authority for controlling these frequencies and they are controlled by each country where they are used. For instance, the Federal Communications Commission controls the frequencies available for use in RFID systems in the United States. Other countries have other controlling authorities. Currently, RFID tags are designed that operate at low frequency (LF), high-frequency (HF), and ultra-high frequency (UHF). LF (125-134.2 kHz and 140-148.5 kHz) and HF (13.56 MHz) RFID tags can be used globally without a license. UHF (868 MHz-928 MHz and the 2.45 GHz band) cannot be used globally as there is no single global standard. In North America, UHF can be used unlicensed for approximately 900-930 MHz (+/−15 MHz from the 915 MHz center frequency) and the 2.45 GHz band, but restrictions exist for transmission power. These frequencies are known as the ISM bands (Industrial Scientific and Medical bands).

Most RFID tags are low-frequency (13 MHz) inductive tags. However, as provided above, RFID tags can operate in the ultra-high frequency (UHF) 915 MHz and 2.45 GHz unlicensed bands. The 915 MHz band, for example, is the de facto industry standard for all commercial inventory RFID in North America. There is 30 MHz of free spectrum available in this band, giving engineers a tremendous amount of freedom to design signal processing that enhances the RFID link. There is even more free radio spectrum, 100 MHz, in the 2.45 GHz band.

Although the UHF radio electronics are normally more expensive to develop than 13 MHz electronics, radio wave propagation characteristics can be more RFID-friendly at the higher UHF frequencies. One such characteristic is the increased operating range of UHF tags. Because 13 MHz RFID relies on an inductive, near-field transfer of power from reader to tag, this technology does not function with a reader-tag separation distance greater than about 1 m; beyond this range, the near-fields die off too rapidly to transfer power by induction.

Higher frequency tags are not so limited in range. By relying on far-field radiation, the UHF tags extend their range over inductive tags by an order of magnitude. This gain may be extended further through creative signal processing, tag antenna diversity, and antenna arrays at the reader; none of these options are available for 13 MHz due to the small bandwidth and large wavelength.

Tags are often manufactured using silicon integrated circuits which require relatively expensive manufacturing processes that place a barrier on the minimum cost of the chip. These processes include the growth of high quality crystalline silicon, a photolithographic process to create the integrated circuit (IC), packaging of the IC, and attachment of the IC the circuit to a board. Organic semiconductor devices offers a low-cost alternative to these traditional silicon-based ICs. Organic semiconductors offer ease of fabrication, as many organic materials can be processed at room temperature and do not require photolithography.

RF Tag Subsystems

Figure 3:
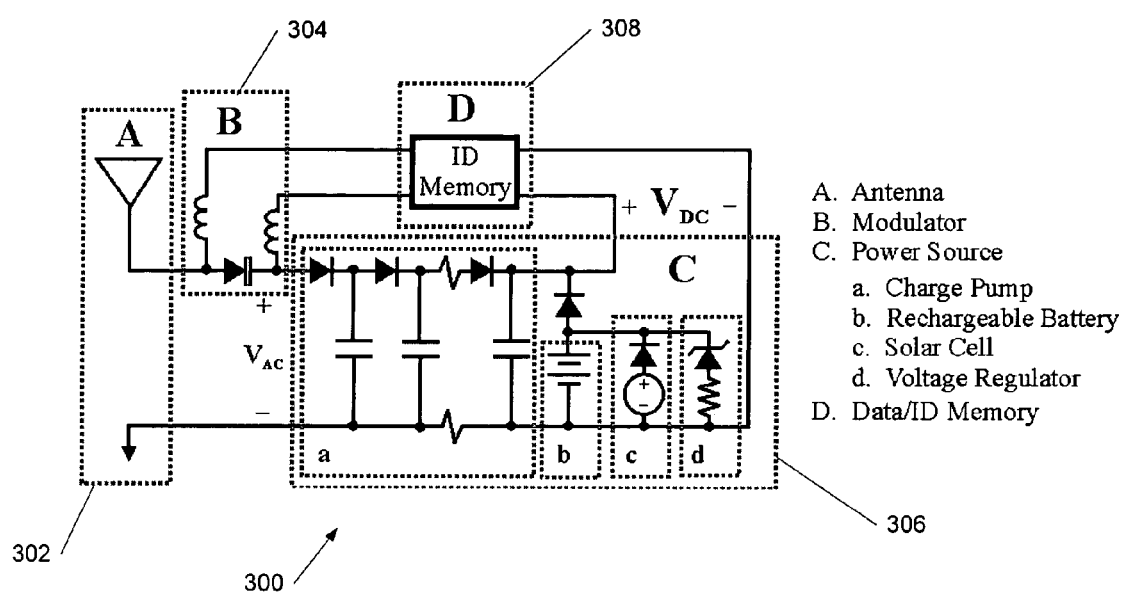
FIG. 3 is an illustration of an exemplary RF tag comprising subsystems of an antenna, an RF modulator, a power supply, and a data/identification memory unit.

FIG. 3 is an illustration of an exemplary RF tag 300 comprising subsystems of an antenna 302, an RF modulator 304, a power supply 306, and a data/identification memory unit 308. Each subsystem is described in greater detail below.

Antenna

Figure 4:
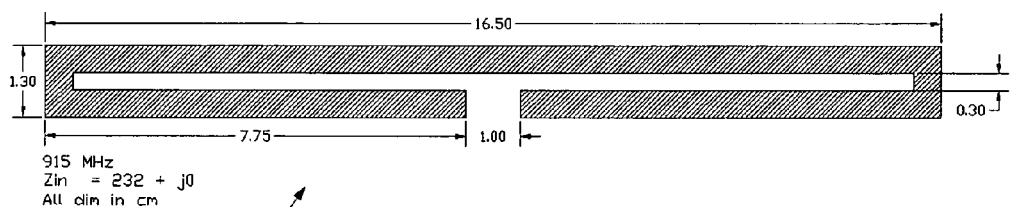
FIG. 4 shows an exemplarily embodiment of the antenna suitable for use at about 915 MHz.

In one embodiment of the RF tag of FIG. 3, the antenna 302 comprises a half-wave folded dipole suitable for use on organic RFID tags which operate in the UHF range (915 MHz band (+/−15 MHz) and 2.45 GHz band (+/−100 MHz)). FIG. 4 shows an exemplarily embodiment of the antenna 400 suitable for use at about 915 MHz, though antennas operable at other frequencies in the UHF range are contemplated within the scope of this invention.

The half-wave folded dipole design of the antenna of FIG. 4 is generally well behaved, can be designed without extensive numerical simulation, is well suited for planar applications without a ground plane, and offers an input impedance of approximately four times that of a simple half-wave dipole, which simplifies the antenna feed network on thin sheets of plastic.

An RF tag antenna 400 embodiment of the invention is printed on a thin sheet of plastic, resulting in negligible effects of the material permittivity. Because of the negligible effects of material permittivity and because there is not a ground plane allows the antenna 400 to be designed as if it were operating in free space.

In FIG. 4, the antenna dimensions of the antenna 400 are such that the driven and parasitic elements (top and bottom strips in FIG. 4) should be less than approximately 1% of a wavelength for the transmission line model of the folded dipole to be accurate. The antenna 400 of FIG. 4 is designed with ground plane, permittivity, end effects, and feed effects ignored; and because the antenna 400 is printed on a very thin sheet of plastic the effects of relative permittivity are ignored, thus $\epsilon_r$ is set equal to 1. The input impedance of the folded dipole of the antenna 400 depends upon the input impedance of a center-fed dipole with an equivalent circular radius of $\rho_e$. The adapted design approach of the antenna of FIG. 4 starts with the parameters of the coplanar-strip folded dipole and then determines the equivalent circular radius of the standard center-fed dipole, with the input impedance of the folded dipole calculated based upon this information. In an embodiment of an antenna designed for operation at approximately 915 MHz, as is shown in FIG. 4, the values for the length and width of the folded dipole can withstand manufacturing tolerances of approximately 1 mm. It is to be appreciated that while the input impedance calculated for the antenna of FIG. 4 was purely real, an inductive component may be present in a constructed antenna. Furthermore, it is noted that thick traces printed on the thin plastic substrate will make the antenna more capacitive and more resistant to on-metal shorting. In certain embodiments of the invention, the antenna traces are about 8 mm to about 1 cm wide.

Figure 5:
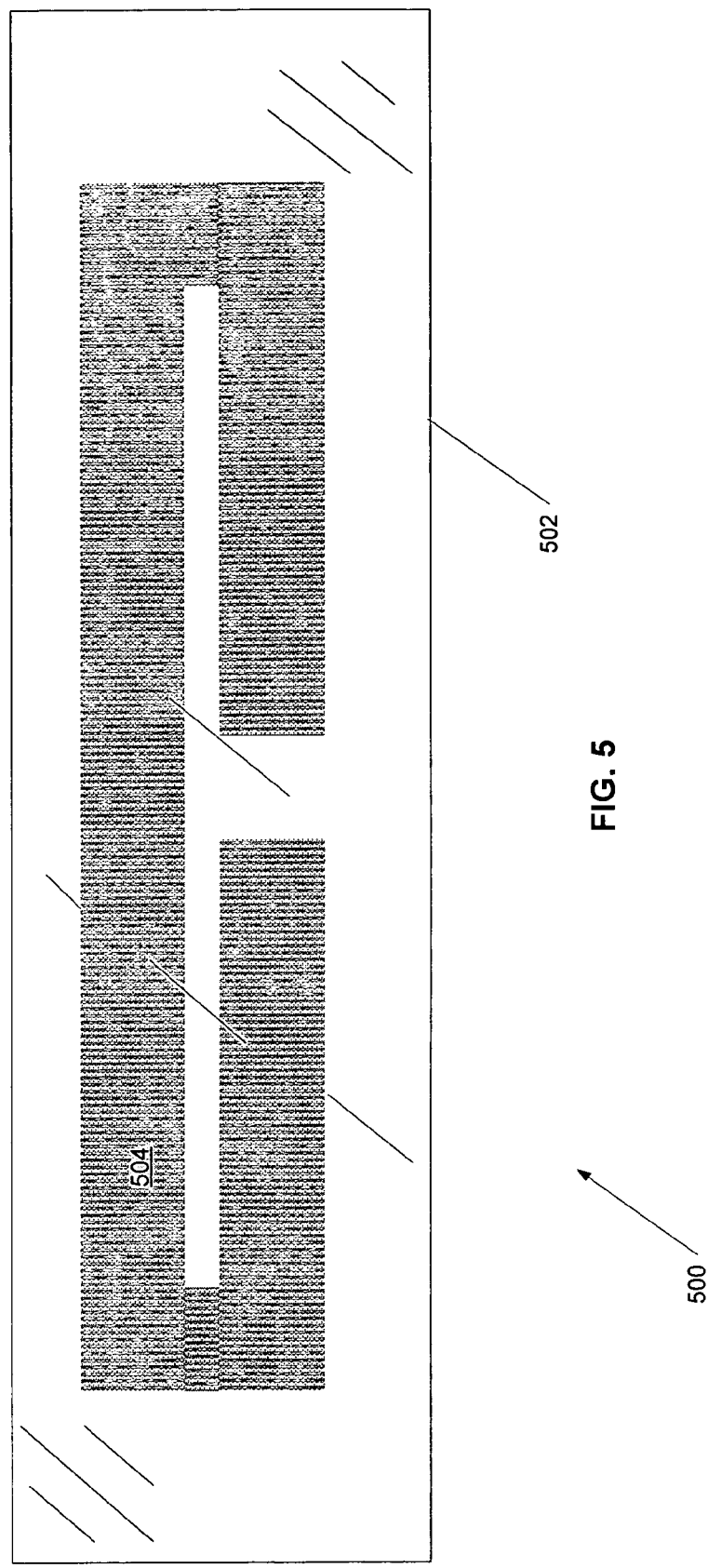
FIG. 5 illustrates an exemplary embodiment of a 915 MHz half-wave dipole antenna made of indium tin oxide (ITO) on a flexible polyethylene teraphthalate (PET) substrate.

Further explanation of the theory and design of folded dipoles, their fabrication, and other embodiments of the antenna can be found in "*A Radio Assay for the Study of Radio Frequency Tag Antenna Performance*," Document ID: PG-TR-050504-JDG, by Joshua David Griffin, May 4, 2005 (MS Thesis, 96 pages), which is fully incorporated herein and made a part hereof Embodiments of an RFID antenna can be fabricated using different materials and different processes. FIG. 5 illustrates an exemplary embodiment of a 915 MHz half-wave dipole antenna 500 made of indium tin oxide (ITO) 504 on a flexible polyethylene teraphthalate (PET) substrate. It is to be appreciated, however, and contemplated within the scope of this invention that other substrate materials such as polyimide, poly-ethylene naphthalate (PEN), liquid crystal polymers (LCP), etc. may be used. It is also to be recognized and appreciated that other conductive materials may be used such as metals including, for example, copper and silver among others. This ITO antenna 500 was made by etching the antenna geometry from an approximately 7 mil ITO-coated PET substrate 502 as available from, for example, Sheldahl (Sheldahl Corporation, Northfield, Minn.). This substrate 502 has an impedance of approximately 60 ohms per centimeter. The etchant used in this embodiment was a 5:5:1 mixture of hydrochloric acid, de-ionized water, and sulfuric acid, though other etchants as they are known in the art may be used. This antenna 500 conducts at RF but may be generally optically transparent or opaque. The antenna 500 is both flexible and conformal. In other embodiments according to the present invention, an antenna and other conductive elements of an RF tag may be fabricated using inkjet deposition of conductive inks on a substrate, as such processes are known to one of ordinary skill in the art. Inkjet material deposition is a manufacturing technique in which ink jet technology is used to deposit materials on substrates. The technique aims to eliminate fixed costs of production and reduce the amount of materials used. Inkjet deposition systems are available from, for example, imaging Technology international (iTi) of Boulder, Colo., and Dimatix Inc. of Santa Clara, Calif., among others.

Figure 6A:
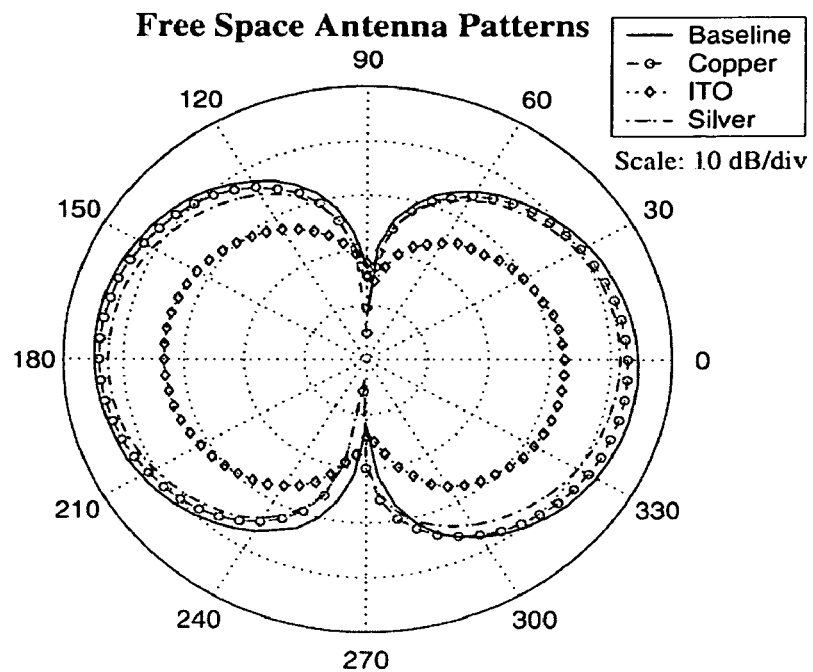
FIGS. 6A-6C illustrate measured radiation patterns of the 915 MHz half-wave folded dipole antenna made from ITO on PET as shown in FIG. 5 in both free space (FIG. 6A) and against a block of aluminum (FIGS. 6B and 6C)
Figure 6B:
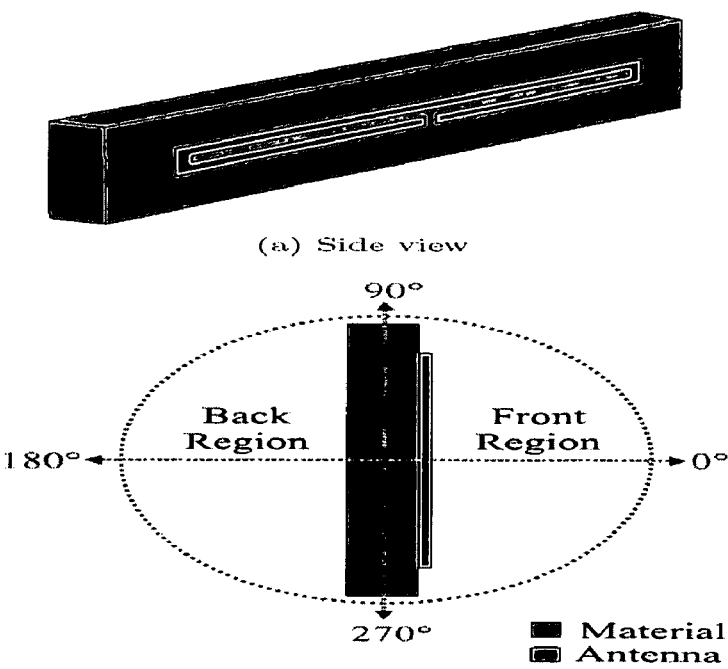
Figure 6C:
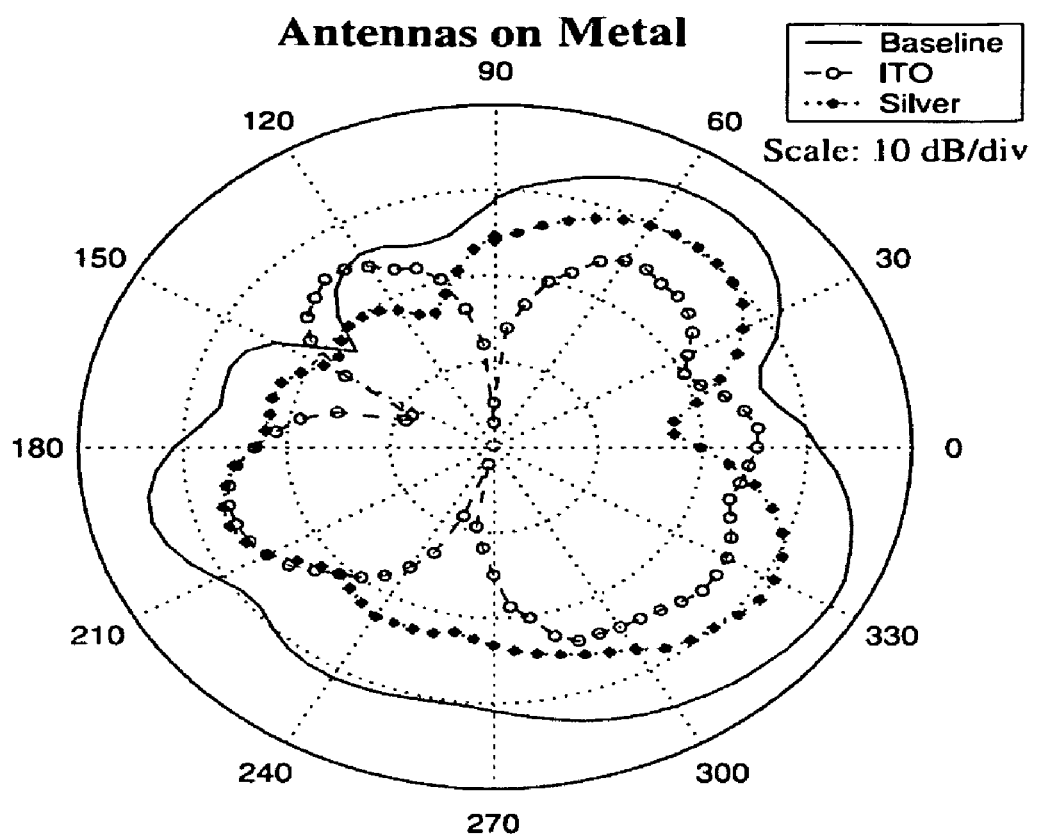

FIGS. 6A-6C illustrates a measured radiation pattern of the 915 MHz half-wave folded dipole antenna made from ITO on PET as shown in FIG. 5 in both free space (FIG. 6A) and against a block of aluminum (FIGS. 6B and 6C). The patterns of the ITO antenna 500 are compared to patterns from three other identical half-wave folded dipole antennas made from common metals. The first type of metallic antenna, dubbed "baseline", is a copper dipole milled from a standard FR4 circuit board and is substantially inflexible. The second type of metallic antenna is a thin-film silver dipole on PET that was fabricated with an electroless deposition process. The third type of metallic antenna was a thin-film copper dipole on PET, also fabricated with an electroless deposition process. Such electroless processes are relatively low-cost, low-temperature manufacturing techniques that may be employed for commercial RFID production.

In the antenna embodiments of FIGS. 6A-C, the electroless silver and copper antennas were fabricated by printing a mask of the antenna outline on a PET substrate that was coated with an adhesion layer for laser printer toner. The printing was done with a standard laser printer. The printed substrates were then placed in solutions where a reduction reaction was triggered to deposit the silver and copper films onto the substrate. The chemicals used for this process were, for example, the HE-300 solution by Peacock Laboratories, Inc. for the silver films and the Circuposit Electroless Copper 3350 by Shipley, for copper films. Once the metal films were deposited, the antennas were dried in a vacuum oven and then placed in an ultrasonic acetone bath to lift the printed mask (and the metal adhering to it) off of the substrate. After the mask was removed, only the metal film antenna remained.

As shown in FIGS. 6A-C, the ITO antenna 500 radiated successfully, but with a drop in efficiency compared to the other metallic antennas. Compared to the baseline antenna, the ITO antenna 500 experienced an additional approximately 10 dB of signal loss in a one-way radio link, presumably from the high-resistivity ITO path for radiating currents. It is likely that much of the power sent into the ITO antenna was absorbed by ohmic (i.e., resistive) losses on the antenna itself.

For the free-space pattern measurement as shown in FIG. 6A, all antennas exhibit the radiation pattern of a half-wave dipole. The patterns in FIGS. 6A and 6C show the E-plane cut of the half-wave folded dipoles (the H-plane cut is omnidirectional). The peak gains correspond to the broadside illumination of the dipole antennas while the nulls correspond to illumination towards the ends of the dipole. For all of the measured dipole antennas, the shape is consistent; the gain is simply changed by a scaling factor due to ohmic loss inefficiencies.

As shown in FIG. 6C, the ITO antenna 500 experienced an additional 6 dB of loss when placed onto the aluminum surface as shown in FIG. 6B. All antennas experienced similar levels of additional power loss, with received power dropping between 6 and 12 dB. It is to be appreciated that this type of link loss may effect an RFID link, since backscattered power experiences this loss twice—once on the forward link and once on the backward link.

Data/Identification Memory

Referring back to FIG. 3, the purpose of the data/identification memory 308 is to provide a baseband signal (analog or digital) that contains sensor, identification, or stored data information to the RF modulator circuitry. In various embodiments, this unit 308 may be designed either in crystalline, amorphous, or organic semiconductors, as are known in the art to one of ordinary skill, that can be integrated into the RF tag design shown in FIG. 3. The methods for designing this unit 308 are known and understood by one of ordinary skill in the art of basic signal processing and elementary radio communications.

RF Modulator

In one embodiment, the RF modulator circuit 304 is a diode that is driven by a data or identification memory unit 308 such that the connection to the data/identification memory unit 308 is isolated from the RF portion of the circuitry with two RF chokes which may be, for example, inductors that theoretically short-circuit at DC and open-circuit at RF. This diode operates at high-frequencies, changing its equivalent RF impedance as the DC bias point across the diode is changed.

Figure 7:
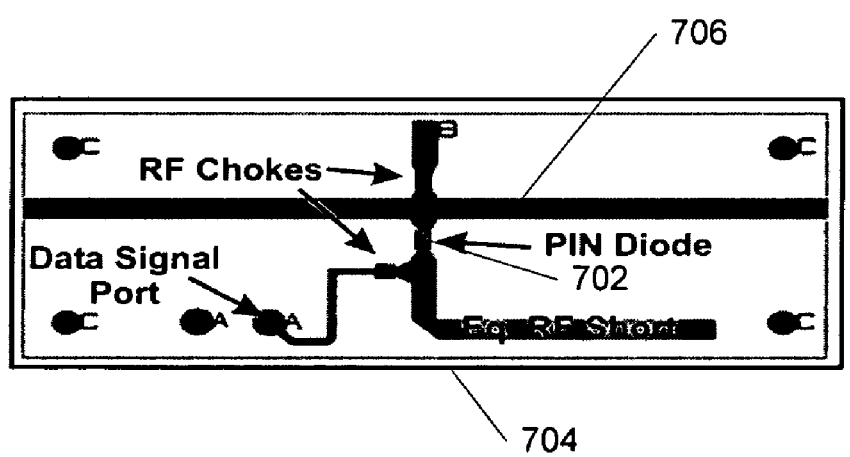
FIG. 7 illustrates an exemplary backscatter modulator.

An exemplary backscatter modulator 700 is shown in FIG. 7. In FIG. 7, a high-frequency PIN diode 702 is used to modulate the reflection coefficient of the RF tag, thereby adding information to any incident power that scatters off of an antenna connected to the terminals of the board in FIG. 7. This circuit board 704 contains a microstrip line 706 for RF signal transport along its central axis. An antenna and a resistive load (not shown FIG. 7) are placed at opposite ends of this line 706, while a PIN diode 702 shunts the connection at the middle.

Driven by a low-frequency data source, the PIN diode 702 is switched between forward and reverse bias currents. In forward bias, the AC-equivalent circuit of the diode 702 is nearly a short-circuit, resulting in a complete RF signal reflection. In the reverse bias, the AC-equivalent circuit of the diode 702 is an open-circuit, allowing the RF signal to pass through the device.

In one embodiment, a modulator may be constructed on an RFID tag using flip-chip techniques comprising flip-chip integration of a high-speed diode onto circuit paths on a substrate. Further embodiments of the invention comprise the process described below for mounting a diode for the modulator circuit 304 in an organic RF tag circuit embodiment.

Figure 8:
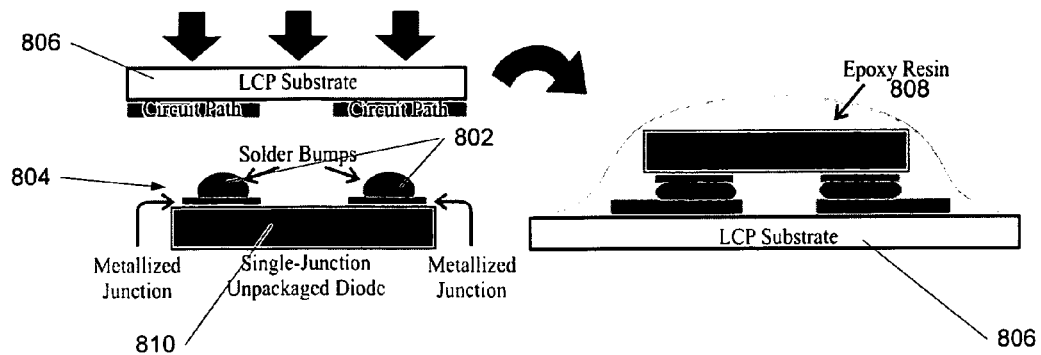
FIG. 8 illustrates an exemplary process of flip-chip integration.

An exemplary process of flip-chip integration is substantially shown in FIG. 8. The first step in this integration is metallizing the junctions of a standard high-frequency diode 810. In one instance this diode 810 can be cannibalized from a packaged, commercial diode with acceptable RF specifications. After metallization of the diode junctions, small solder bumps 802 are added to the inverted diode assembly 804. A flexible polymer substrate (e.g., LCP, PET, PEN, etc. for example) 806 with circuit paths and the diode assembly are then heated and pressed together, electrically connected by the soft solder bumps 802. To lower the processing temperature, silver paste or other conducting adhesive may be used to fix the chip to the substrate 806. An epoxy resin or elastomeric encapsulant 808 may then added to protect the diode and add mechanical stability. This hybrid electronic circuitry—the integration of a crystalline diode 810 into an otherwise organic electronic baseband circuit allows for a flexible organic based RFID circuit to be used in a microwave frequency RFID tag.

Power Source

Figure 9:
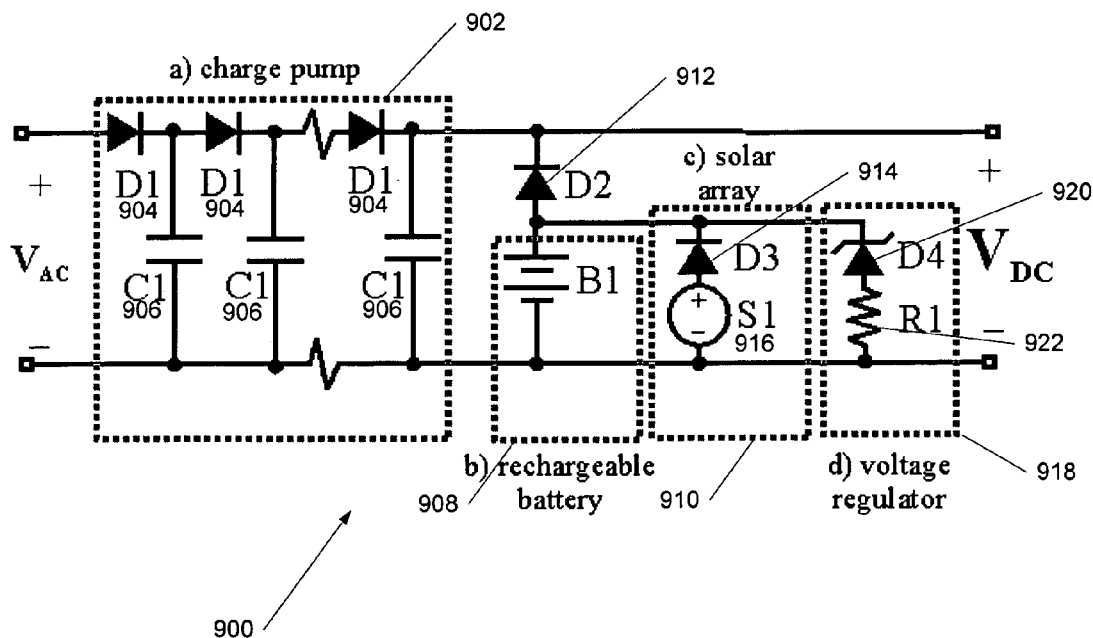
FIG. 9 illustrates an exemplary embodiment of a three-mode power source (an RF charge pump, a rechargeable chemical battery, and a solar cell) for an exemplary RF tag.

In various embodiments, an RF tag may utilize a power source. For example, an assisted passive or active tag may have a battery, while even a purely passive tag may use a charge pump to reflect information back to an interrogator. An exemplary embodiment of a three-mode power source 900 (an RF charge pump, a rechargeable chemical battery, and a solar cell) for an exemplary RF tag is shown in FIG. 9. This exemplary circuit demonstrates how several different power-scavenging circuits may be blended together into a reliable source for driving memory and signal processing circuitry on board the RF tag, yet it is to be appreciated that other embodiments of a power source may comprise only one or more of the modes described herein. It is also to be appreciated that the three mode power source shown in FIG. 9 may be used to power any radio device, not just an RF tag. The design and construction of each section of the power source 900 is described in greater detail below.

A charge pump 902 consists of interlocking stages of diodes and capacitors that both rectify and increase increasing sinusoidal voltage. Because an RF tag receives such small voltage levels (microvolt or less) from an interrogator, the received voltage must be boosted to a higher level and converted to DC so that it can drive logic and signal processing circuitry. The charge pump 902 may contain an arbitrary number of diode-capacitor stages. As the number of stages increases, incoming signals are rectified and boosted to a higher DC voltage. However, an increased number of stages will lower the overall conversion efficiency.

The primary components of this circuit are diodes (D1) 904 and capacitors (C1) 906. For each stage, an incoming sinusoidal voltage pushes current through the diode 904 in the forward direction and charge up the capacitor 906. This charge becomes "trapped" on the right-hand side of the diode (D1) 904 and persists as a slowly-decaying, DC voltage. Subsequent sinusoidal oscillations superimpose additional waves of current on top of this voltage, increasing the DC voltage in following stages. After several cycles of input AC voltage, the charge pump 902 reaches a steady-state equilibrium where the right-hand output is a DC voltage that is much higher in amplitude that the original left-hand side sinusoidal input. Of course, power is conserved in this collection of passive components, so that the current drawn from the output of the charge pump 902 must be reduced in proportion to the increase of the voltage.

Although any diode and capacitor connected as illustrated in FIG. 9 can be used as a charge pump, there are several desirable characteristics for such devices. First, the circuit performs better when the diodes (D1) 904 have low turn-on voltages. For this reason, conventional charge pumps are often designed with silicon-germanium (SiGe) or gallium-arsenide (GaAs) semiconductor diodes, since straight silicon (Si) diodes have higher relative turn-on voltages (approximately 0.7 V). The charge pump 902 also operates more efficiently if the capacitors (C1) 906 have low shunt loss. Their capacitance in Farads must also result in a time-constant that is several AC wave cycles in duration.

The charge pump 902 may be placed in series or in parallel to the modulator unit. Since the charge pump 902 itself may resemble a time-varying load, it may contribute self-interference to the backscatter modulated signal, which may suggest a reason to add alternative power sources to the RFID tag in some embodiments.

A rechargeable battery (B1) 908 used in a power source 900 may be, for example, any of the chemical batteries used in electronic circuits. In fact, a non-rechargeable battery could be used as well, although the rechargeable cell would generally lend a longer lifetime to the RF tag. Preferably, a low profile, flat battery with small form factor would be used for integration with a low-power RFID circuit, though other battery types are not precluded. The rechargeable battery 908 would supply the principle DC voltage source at the output of the RF tag power source whenever other energy modes (e.g., a solar cell 910 or charge pump 902) proved to be inadequate. If the RF tag is equipped with a solar array 910 and the solar array (conventional or organic) 910 was sufficiently illuminated, the DC battery 908 would recharge itself using the power from this unit 910. Since the charge pump's power output is usually small and intermittent, the battery 908 is prevented from recharging itself from the rectified charge pump voltage by the blocking diode (D2) 912 in FIG. 9.

The power source 900 of FIG. 9 also comprises an energy mode of a solar array 910. The solar array 910 generally consists of one or more photovoltaic cells, constructed from either organic or inorganic semiconductors. The solar array 910 is connected to the rechargeable battery via a diode (D3) 914 that prevents backflow of power from the battery 908 to the solar cell(s) 910. In this configuration, the solar power source (S1) 916 will either provide power to the output of the whole power source, or it will recharge the chemical battery (B1) 908. The solar source (S1) 916 will not sink power from the charge pump 902.

In some embodiments, the power source 900 for an RF tag comprises a voltage regulator 918. The purpose of the voltage regulator 918 is to ensure that large currents do not build up in the highest-powered circuitry components in the power supply 900. If the solar cell 910 is over-illuminated or the battery 908 is charged beyond a safe voltage, a Zener diode (D4) 920 will go into reverse breakdown at a specified voltage. Excess power will then be dissipated across the diode 920 and the small resistance (R1) 922.

Various combinations of energy modes for power sources can be used including an RF charge pump, battery, solar array, thermocouple, momentum converter, or any energy-scavenging mechanism. In addition it is possible to implement a mixed-mode power source with both organic and conventional electronics. For example, a solar array could use organic semiconductors, while a charge pump could employ SiGe diodes on an integrated circuit.

The solar array 910 may be of a type described in co-pending U.S. Utility patent application Ser. No. 11/232,188, entitled "Photovoltaic Cell" by Kippelen et al., filed on 20 Sep. 2005, incorporated herein by reference as if rewritten in full, and can be used alone as the sole power source for an RF tag or in conjunction with other power sources, including those described herein. Further embodiments of the invention comprise the photovoltaic cell of the '188 application with organic RF tags of embodiments of this invention constructed on, and sharing, the same substrate.

Exemplary RFID Tags and Applications Thereof

An exemplary application for RFID tag embodiments according to this invention is their use as toll tags, for example, an UHF RF tag that is conformal, uses organic solar cells, and has an ITO radiating element. In application, the tag would adhere to the windshield (optimal placement) without significantly distracting or obstructing vision.

Figure 10:
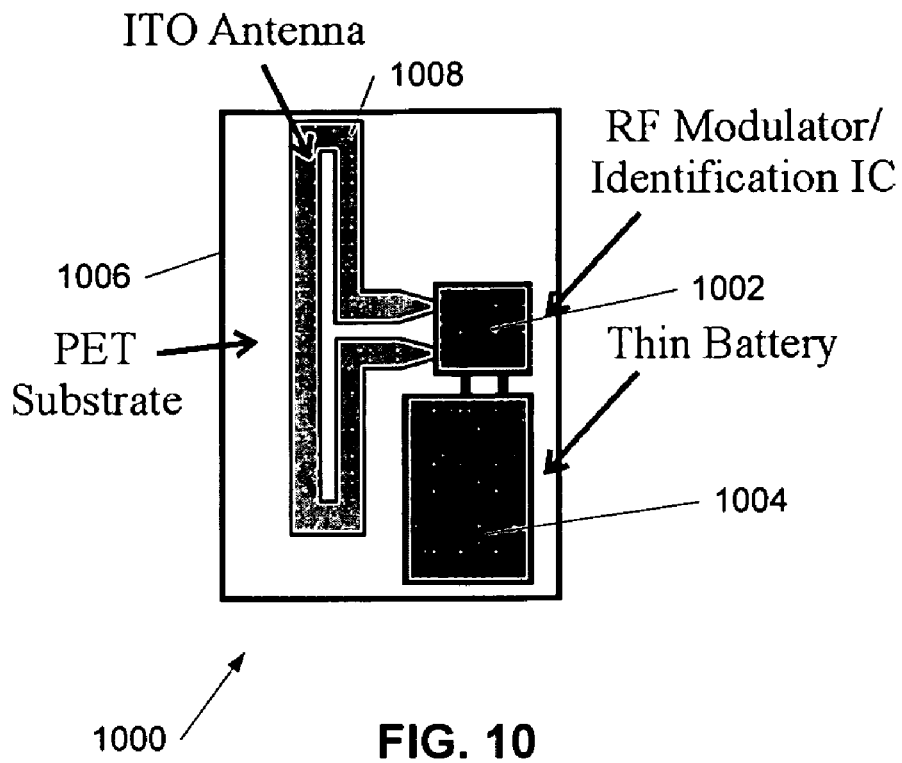
FIG. 10 illustrates an exemplary embodiment of an RF tag suitable for use as a toll tag comprising an ITO-antenna on a flexible substrate.

One embodiment of an RF tag suitable for use as a toll tag is one comprising an ITO-antenna on a flexible substrate. In one embodiment, this tag 1000 may be constructed by using ICs 1002 of an existing tag, incorporating an ultrathin battery 1004, and mounting these components on a PET substrate 1006 with an ITO antenna 1008 and having ITO circuit traces. A diagram of this exemplary tag is shown in FIG. 10. It is to be appreciated that at least a portion of the tag's footprint in FIG. 10 may be transparent or opaque thereby reducing vision obstruction.

Figure 11:
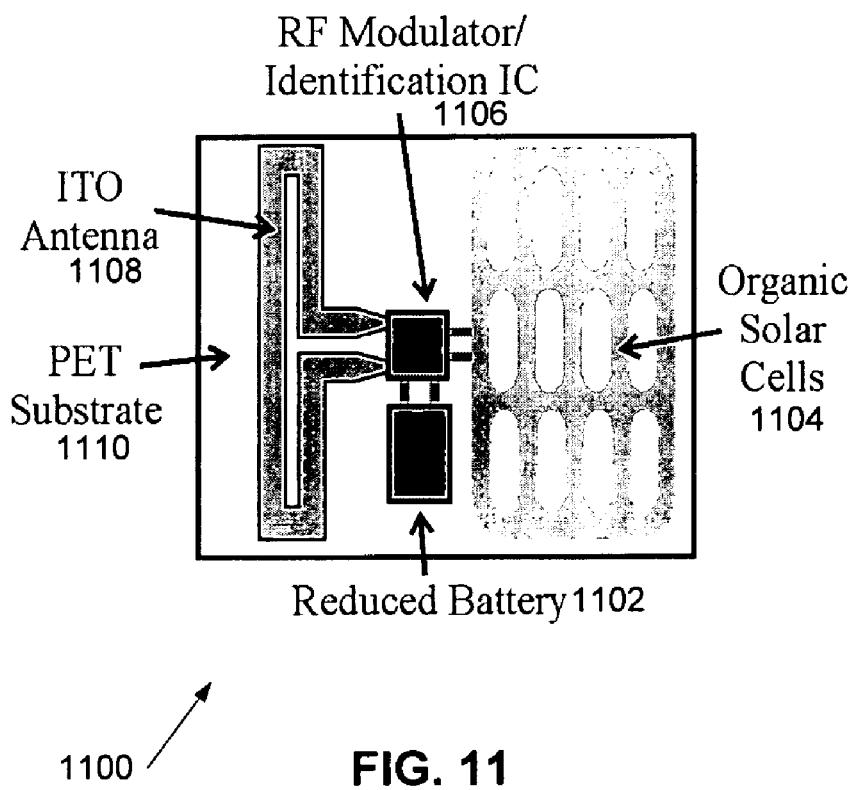
FIG. 11 illustrates an exemplary second embodiment of an RFID tag suitable as a toll tag comprising a tag whose operation is enhanced with organic photovoltaic (OPV) cells and a thin battery with a very small footprint on the tag.

A second embodiment of an RFID suitable as a toll tag is a tag whose operation is enhanced with organic photovoltaic (OPV) cells and a thin battery with a very small footprint on the tag. This exemplary tag 1100 is illustrated in FIG. 11. In the embodiment of FIG. 11, the battery 1102 can be reduced in size compared to the tag design of FIG. 10 since the battery 1102 only needs to store several day's worth of power instead of the 3-5 year's worth of power required by an active tag. The purpose of the OPV cells 1104 is to recharge the small battery 1102 driving the modulating IC 1106. Given that most drivers do not go more than several days without driving in daylight, the OPV cells 1104 only have to "top off" the battery 1102 on a semi-regular basis.

The solar cell 1104 of FIG. 11 may, of its own accord, be enough to power the toll tag 1100 when the driver passes under a toll plaza. Since toll collection plazas are very well lit, it is possible that the solar cells 1104 could even provide sufficient operation power at night. In this case, the battery 1102 is simply a reliability-enhancing component. To build this type of tag 1100, organic solar cells 1104 may be fabricated on the same substrate 1110 as an ITO dipole antenna 1108.

Figure 12:
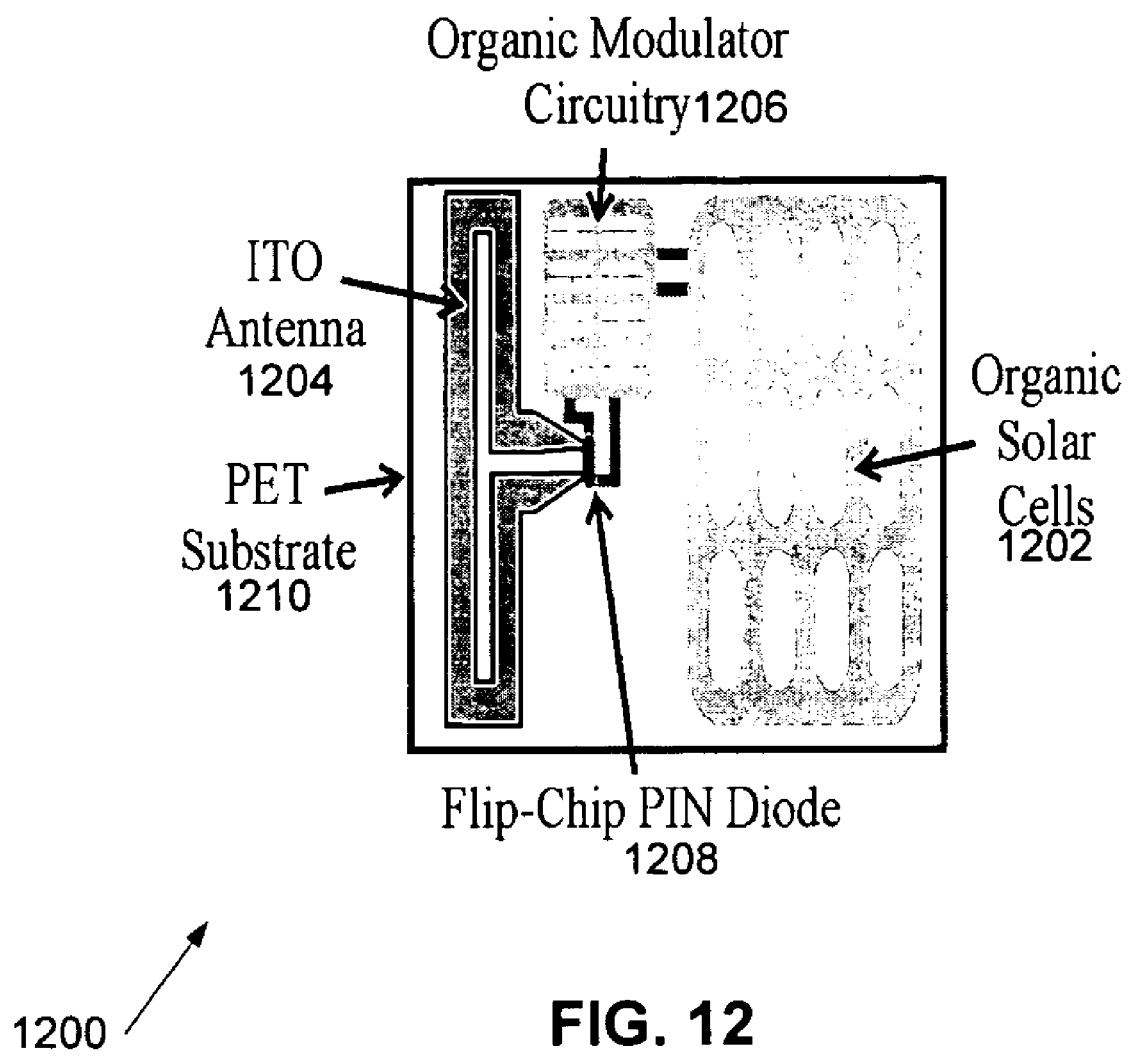
FIG. 12 illustrates an exemplary third embodiment of a tag suitable for use as a toll tag comprising an organic hybrid tag.

A third embodiment of a tag suitable for use as a toll tag is an organic hybrid tag. This embodiment uses OPV solar cells 1202, an ITO dipole 1204, and baseband modulator circuitry 1206 constructed from organic field-effect transistors (OFETs) as are known to one of ordinary skill in the art. A sliver of crystalline silicon PIN diode 1208 is flip-chip bonded to the circuit traces on a polymer substrate 1210 for modulation purposes. FIG. 12 shows the layout of this tag.

Although several aspects of the present invention have been disclosed in the foregoing specification, it is understood by those skilled in the art that many modifications and other aspects of the invention will come to mind to which the invention pertains, having the benefit of the teaching presented in the foregoing description and associated drawings. It is thus understood that the invention is not limited to the specific aspects disclosed hereinabove, and that many modifications and other aspects are intended to be included within the scope of the appended claims. Moreover, although specific terms are employed herein, as well as in the claims which follow, they are used only in a generic and descriptive sense, and not for the purposes of limiting the described invention.

What is claimed:

1. A radio frequency identification (RFID) transponder comprised of:
   a substantially flexible, conformal substrate whereupon is disposed one or more electronic devices comprising;
      an antenna;
      a power source, wherein said power source comprises an organic photovoltaic cell, an RF charge pump comprised of SiGe or GaAs semiconductor diodes, a battery, and a voltage regulator;

a modulator comprising a crystalline diode bonded to organic circuitry; and a data/identification memory unit, wherein said electronic devices are operatively coupled using one or more conductive circuits disposed upon said flexible, conformal substrate, and wherein said RFID transponder is operable at frequencies between 2.35 and 2.55 GHz.

2. The RFID transponder of claim 1, wherein said antenna comprises a half-wave, folded dipole antenna.

3. The RFID transponder of claim 2, wherein said half-wave folded dipole antenna is designed for resonance at a frequency greater than or equal to 900 megahertz (MHz).

4. The RFID transponder of claim 3, wherein said half-wave folded dipole antenna is designed for resonance at a frequency between 2.35 and 2.55 GHz.

5. The RFID transponder of claim 4, wherein said half-wave folded dipole antenna is designed for resonance at a frequency of 2.45 GHz.

6. The RFID transponder of claim 1, wherein said antenna is comprised of an electrically-conductive material deposited on the substrate.

7. The RFID transponder of claim 6, wherein said conductive material is indium-tin oxide deposited on the substrate.

8. The RFID transponder of claim 6, wherein said conductive material is a thin-film metallic material deposited on the substrate by an electroless deposition process.

9. The RFID transponder of claim 8, wherein said thin-film metallic material is selected from a group consisting of thin-film copper material and thin-film silver material.

10. The RFID transponder of claim 6, wherein said conductive material is a conductive ink deposited on the substrate by an inkjet process.

11. The RFID transponder of claim 6, wherein said substrate is at least in part optically transparent.

12. The RFID transponder of claim 6, wherein said substrate is comprised of material selected from a group consisting of polyethylene teraphthalate (PET), polyimide, poly-ethylene naphthalate (PEN), and liquid crystal polymers (LCP).

13. The RFID transponder of claim 11, wherein said antenna is comprised of indium tin oxide (ITO) deposited on the substrate such that said antenna is at least in part optically transparent.

14. The RFID transponder of claim 1, wherein said flexible substrate is comprised of one or more of polyethylene teraphthalate (PET), polyimide, poly-ethylene naphthalate (PEN), or liquid crystal polymers (LCP).

15. The RFID transponder of claim 1, wherein said antenna is comprised of indium tin oxide (ITO) deposited on the substrate comprised of polyethylene teraphthalate (PET) such that said antenna is at least in part optically transparent.

16. The RFID transponder of claim 1, wherein the substrate is comprised of flexible polyethylene teraphthalate (PET) and said antenna is comprised of thin-film metallic material deposited by electroless deposition process on the substrate.

17. The RFID transponder of claim 16, wherein said thin-film metallic material is selected from the group consisting of thin-film copper material and thin-film silver material.

18. The RFID transponder of claim 1, wherein the substrate is comprised of flexible polyethylene teraphthalate (PET) and said antenna is comprised of a conductive ink deposited by an inkjet process on the substrate.

19. The RFID transponder of claim 1, wherein one or more of said modulator, power source or data/identification memory unit are disposed onto said substrate and said one or more conductive circuits by flip-chip application wherein said flip-chip application comprises one or more conductive bumps at least partially in contact with said one or more of said modulator, power source or data/identification memory unit and said one or more conductive circuits and said one or more of said modulator, power source or data/identification memory unit are at least partially covered with an epoxy resin.

20. The RFID transponder of claim 1, wherein said battery comprises a rechargeable battery.

21. The RFID transponder of claim 1, wherein said modulator comprises a positive-intrinsic-negative (PIN) diode.

22. The RFID transponder of claim 21, wherein said PIN diode comprises a crystalline silicon PIN diode.

23. The RFID transponder of claim 21, wherein said PIN diode is disposed onto said substrate and said one or more conductive circuits by flip-chip application comprising one or more conductive bumps at least partially in contact with said one or more conductive elements of said PIN diode and said PIN diode is at least partially covered with an epoxy resin.

24. The RFID transponder of claim 1, wherein said RFID transponder is used on vehicles in an on-vehicle radio-frequency (RF) automated toll system.

25. The RFID transponder of claim 1, wherein said substrate is at least in part optically transparent.

26. The RFID transponder of claim 25, wherein said modulator comprises a positive-intrinsic-negative (PIN) diode.

27. The RFID transponder of claim 25, wherein said RFID transponder is used on vehicles in an on-vehicle radio-frequency (RF) automated toll system.

28. A radio frequency identification (RFID) transponder comprised of:

a flexible polyethylene teraphthalate (PET) substrate whereupon is disposed one or more electronic devices comprising;

a half-wave, folded dipole antenna comprised of indium tin oxide (ITO) deposited on the flexible PET substrate;

a power source, wherein said power source comprises an organic photovoltaic cell, an RF charge pump comprised of SiGe or GaAs semiconductor diodes, a rechargeable battery, and a voltage regulator;

a modulator comprising a crystalline diode bonded to organic circuitry; and a data/identification memory unit, wherein said electronic devices are operatively coupled using one or more conductive circuits disposed upon said flexible (PET) substrate.

29. The RFID transponder of claim 28, wherein said half-wave, folded dipole antenna comprises said half-wave, folded dipole antenna having a resonant frequency of greater than or equal to 900 megahertz (MHz).

30. The RFID transponder of claim 28, wherein said half-wave, folded dipole antenna comprises said half-wave, folded dipole antenna having a resonant frequency of between 2.35 and 2.55 GHz.

31. The RFID transponder of claim 29, wherein said half-wave, folded dipole antenna comprises said half-wave, folded dipole antenna having a resonant frequency of 2.45 gigahertz (GHz).

* * * * *

UNITED STATES PATENT AND TRADEMARK OFFICE
CERTIFICATE OF CORRECTION

PATENT NO. : 7,642,918 B2  Page 1 of 1
APPLICATION NO. : 11/584086
DATED : January 5, 2010
INVENTOR(S) : Kippelen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 424 days.

Signed and Sealed this

Sixteenth Day of November, 2010

David J. Kappos
*Director of the United States Patent and Trademark Office*